Dec. 20, 1955  A. T. CAPE ET AL  2,727,834
METHODS OF BRAZING AND COATING STAINLESS STEEL PARTS
Filed Sept. 15, 1953
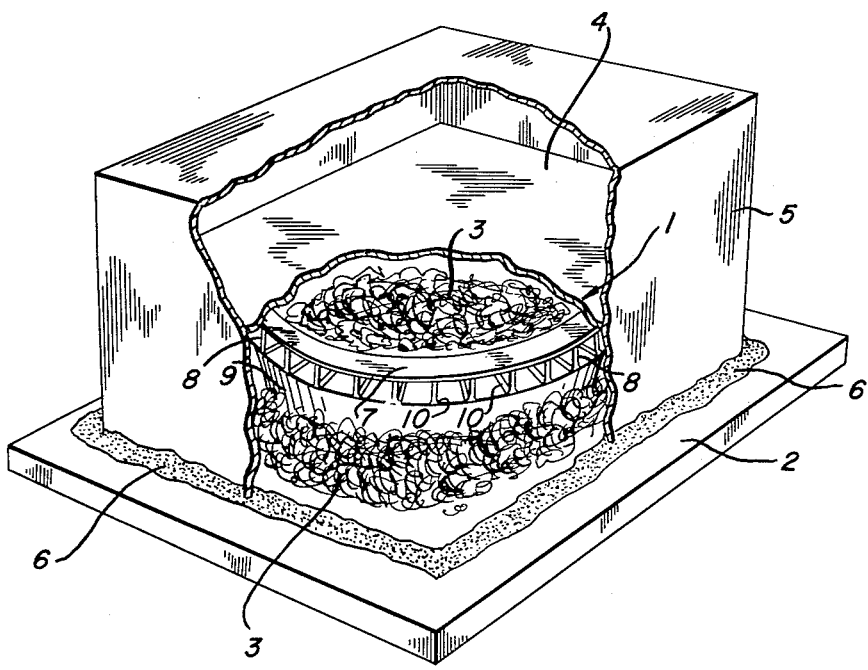
INVENTORS
ARTHUR T. CAPE &
BY ROBERT E. JONES
ATTORNEYS

United States Patent Office 2,727,834
Patented Dec. 20, 1955

2,727,834

METHODS OF BRAZING AND COATING STAINLESS STEEL PARTS

Arthur T. Cape, Los Angeles, and Robert E. Jones, La Canada, Calif., assignors to Superweld Corp., North Hollywood, Calif., a corporation of California Application September 15, 1953, Serial No. 380,300

3 Claims. (Cl. 117—131)

This invention relates, as indicated, to methods of brazing and coating stainless steel parts.

In the copending application of Robert E. Jones, Serial No. 339,612, filed March 2, 1953, there is disclosed a method of copper brazing stainless steel parts in a reducing atmosphere containing 14% $H_2$, 5% $CO_2$, 7% CO, with the remainder $N_2$, using sodium or potassium silicate as a fluxing agent. The fluxing agent not only holds the copper wire, used as the brazing metal, securely in place, but promotes the flow of copper into the joints, without leaving more than the merest trace of a slag.

While the foregoing reducing atmosphere is satisfactory for copper brazing stainless steel parts, we have discovered that when stainless steel parts are to be brazed, using nickel-silicon-boron alloys as the brazing metal, instead of copper, that a much more highly reducing atmosphere is required, for the following reasons:

1. The silicon and boron in the brazing metal oxidize in the normal reducing atmosphere and form a slag, which consists of small, round particles, which slag gives a rough objectionable surface to the melted material. This is particularly true in cases where the brazing metal is placed outside the joint and is allowed to flow into it, for, in such cases, the surface is not only objectionable from the standpoint of appearance, but actually restricts the flow of the brazing metal into the joint. Moreover, in cases where fillet joints are made, a rough surface on the fillet can be a source of stress concentration.

2. The scale which is formed on the parts to be brazed is a very tight one and consists largely of Fe, $Fe_3O_4$ and a very small amount of $Cr_2O_3$. The Fe and $Fe_3O_4$ in the scale are formed by oxidation of the iron in the stainless steel to FeO, which, in turn, is decomposed on cooling below 1100° F. to form Fe and $Fe_3O_4$, as follows:

$$4FeO \rightarrow Fe + Fe_3O_4$$

$Cr_2O_3$ is formed by oxidation of the chromium in the stainless steel.

In order to avoid the formation of slag and scale of the foregoing properties and characteristics on the stainless steel parts to be brazed, when nickel-silicon-boron alloys are used as the brazing metal, we have found it necessary to braze the parts in an atmosphere which is much more reducing than normal reducing atmospheres, but which, at the same time, is not carburizing in nature, since it is necessary to avoid carburization of the heating elements of the brazing furnace, which elements are usually made of Nichrome.

We have discovered that carburization of the Nichrome heating elements of the brazing furnace can be avoided, as well as formation of slag and scale of the character which have been described, by brazing the parts in a highly reducing atmosphere which is segregated from the heating elements or other carburizable furnace parts. This segregated highly reducing atmosphere is produced in the folowing manner:

The parts to be brazed are usually placed on alloy steel trays which are carried through a roller-hearth conveyor-type electric brazing furnace.

Instead of placing the stainless steel parts which are to be brazed by means of the nickel-silicon-boron alloys directly on alloy steel trays, we place the parts, as indicated generally by reference character 1 in the accompanying drawing, on a graphite base or platform 2, and surround the parts with activated charcoal 3, after which a graphite block or plate 4 is placed over the parts, and a metal or impervious ceramic cover 5 is placed on the base or platform 2, the lower edge of the cover being packed or embedded in sand 6. The parts in this case, shown by way of example only, may consist of an annular member 7 having circumferentially-spaced blades 8 which are to be brazed to a conical shaped member 9 by means of fillets 10 of the nickel-silicon-boron alloy which has been referred to. The graphite block or plate 4 preferably fills the entire transverse cross-sectional area within the cover 5, so as to extend beyond the periphery of the annular member 7, since best results have been accomplished where the graphite plate constitutes, in effect, a canopy for the parts to be brazed.

The assembly, consisting of the elements 1 to 10, as described, is then placed on the conveyor of the brazing furnace and run through the furnace.

As the assembly passes through the brazing furnace, the reducing gas which has been described flows through the sand 6 and into the cover 5, reacting with the graphite plate 4 to create a highly reducing gas which is very low in $CO_2$, and which, since it is retained within the cover until completion of the brazing operations, cannot in any way affect the heating elements or other carburizable parts in the furnace.

Although the use of the cover 5 tends to increase the time required to heat the parts to be brazed to the required brazing temperature, the actual time required for brazing is not increased by more than 50%, and even if the time required for brazing were doubled, the brazing operation would still be a successful one, from the standpoint of economy.

After the parts have been run through the furnace, and the cover removed, the parts emerge with a green scale, which is relatively flocculent or loose. The brazing metal is free from any minute particles of slag which cause roughness, and the brazed parts are smooth.

We have also found that by plating the parts to be brazed with nickel or copper, prior to brazing, that it is possible to do without the use of a flux. However, in most cases, a flux is desirable, and we prefer to use potassium pentaborate, or potassium pentaborate with, in some cases, a small amount of potassium bifluoride (KHF), for this purpose. The potassium pentaborate-potassium bifluoride mixture is of value in holding the powdered nickel-silicon-boron alloy in place during the brazing operation, and may be incorporated in the alloy when the alloy is prepared or mixed.

The mechanism or theory of the invention is not completely understood, but it is apparently important that the graphite plate 4 or similar form of carbon be in close proximity to the parts to be brazed, so that the reaction between the reducing gas and the graphite plate will occur as closely as possible to the parts or joints to be brazed. For this purpose, it is preferred that the graphite block or a steel plate coated with carbon black extend transversely across the space within the cover, although satisfactory results have been obtained by using graphite plates in a vertical position within the cover, as well as by coating the inner walls of the cover with lampblack, instead of using graphite plates, the lampblack reacting with the reducing gas to produce the desired results. In some cases, the activated charcoal 3 may be dispensed with. Moreover, lampblack may be

used on the inside of the cover or on plates of steel adjacent the work to be brazed, to increase reducing conditions. We have also found that putting the carbon black directly on the part itself which is being brazed is an additional aid. Furthermore, if the metal powder mixed with flux, in a fillet, is covered with carbon black, the resulting fillet is smoother and the flow of metal is better when the parts are passed through the furnace.

Although the invention has been described particularly with reference to the brazing of stainless steel parts, it is also adaptable to the coating of stainless steel parts with nickel-silicon-boron alloys, where such a coating is desired for hard facing purposes, for wear or corrosion resistance, where a smooth surface is most desirable.

The nickel-silicon-boron alloys are preferably used in powdered form, although the alloy may be in other forms, such, for example, as in the form of small slugs of metal. The powder may be held either by means of the flux, which when it is dry, is sufficiently strong to hold the powder in place, or it may be held in place by the use of sodium or potassium silicate, preferably the latter.

By "nickel-silicon-boron" alloys, we refer generally to the type of alloys described in the copending application of A. T. Cape, Serial No. 285,801, filed May 2, 1952, although the invention is applicable to alloys of this type containing nickel, silicon and boron in amounts considerably outside the ranges disclosed in said copending application, and containing also chromium in substantial amounts. The invention is applicable generally to all such alloys with a melting point below about 2100° F.

It will be understood that various changes may be made in the steps of the method, as described, or in the nature of the materials used, as well as in the apparatus employed in practicing the method, without departing from the spirit of the invention or the scope of the subjoined claims.

Having thus described our invention, we claim:

1. The method of brazing or coating stainless steel parts to be brazed or coated with nickel-silicon-boron alloys, in a furnace having heating elements and other parts which are subject to carburization, and in which furnace a reducing gas atmosphere is maintained which is substantially non-carburizing in relation to said heating elements and other furnace parts, said method comprising the steps of confining the parts to be brazed or coated along with the nickel-silicon-boron alloy which is used as the brazing or coating material, in a substantially closed container in which carbon is maintained in close proximity to the parts within the container, and heating the container and its contents by means of the furnace to a temperature at which brazing or coating of the parts is effected, whereby said reducing gas reacts with said carbon to create a highly reducing gas within the container until completion of the brazing or coating, and does not react with said heating elements and other carburizable furnace parts.

2. The method, as recited in claim 1, in which the furnace reducing gas atmosphere contains relatively low quantities of hydrogen, carbon dioxide and carbon monoxide, and in which the highly reducing gas within the container is very low in carbon dioxide.

3. The method, as recited in claim 2, in which a graphite plate extends transversely over the parts within the container.

References Cited in the file of this patent

UNITED STATES PATENTS

| | | |
|---|---|---|
| 136,213 | Cochrane | Feb. 25, 1873 |
| 1,110,010 | Rudder | Sept. 8, 1914 |
| 1,892,607 | Bundy | Dec. 27, 1932 |
| 2,040,370 | Fisher | May 12, 1936 |
| 2,057,518 | Fraser et al. | Oct. 13, 1936 |
| 2,083,433 | Croft et al. | June 8, 1937 |
| 2,296,380 | Davidson | Sept. 22, 1942 |
| 2,301,812 | Rentschler et al. | Nov. 10, 1942 |
| 2,315,294 | Stewart et al. | Mar. 30, 1943 |
| 2,322,507 | Cole | June 22, 1943 |

OTHER REFERENCES

Materials and Methods, October 1949, p. 84.